March 25, 1958        B. L. STEIERMAN        2,828,422
METHOD AND APPARATUS FOR GAUGING LIQUID LEVEL
Filed Aug. 9, 1954        3 Sheets-Sheet 1
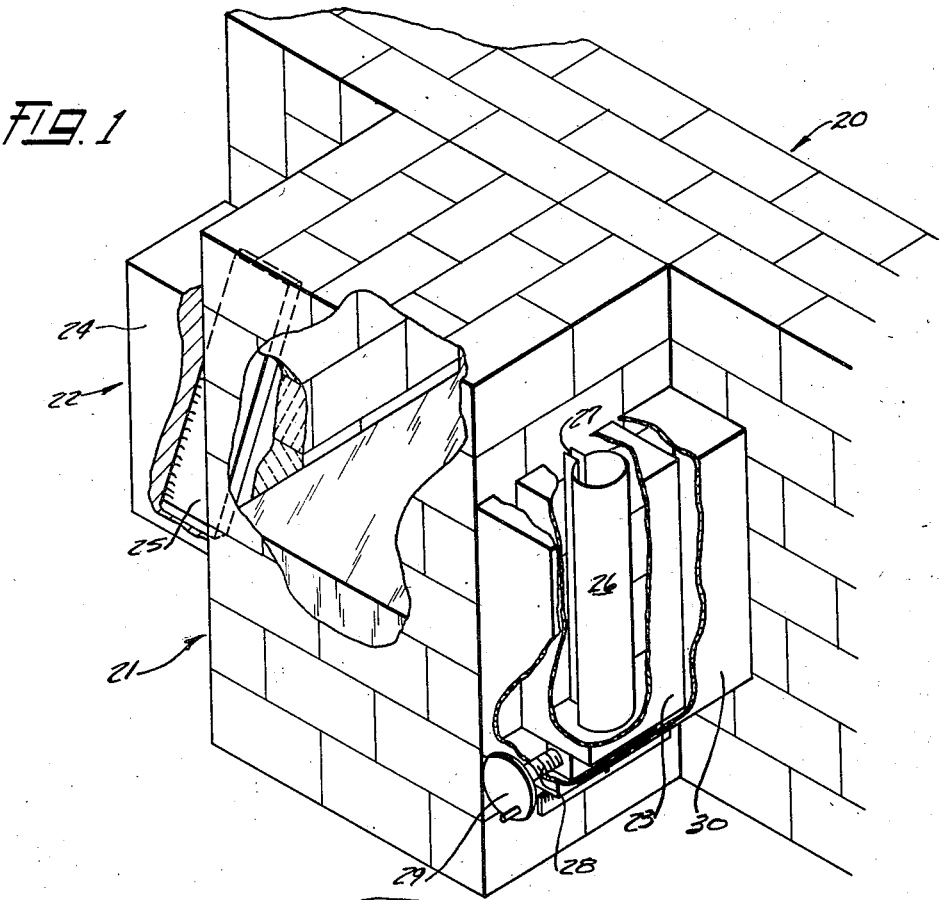
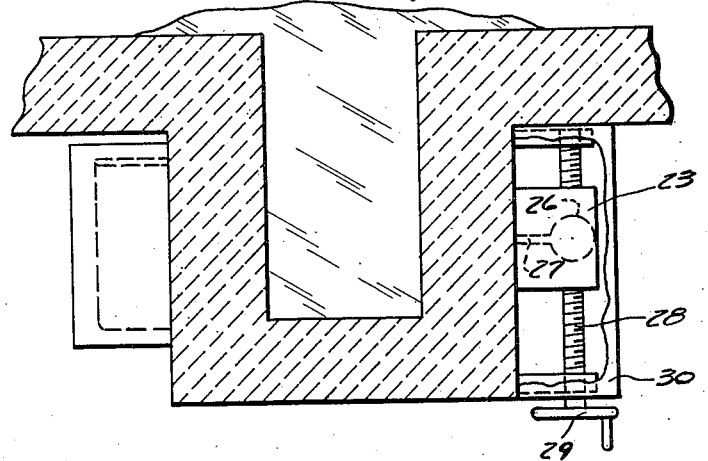
INVENTOR
BERNARD L. STEIERMAN
BY W. A. Schaich
& B. C. Toussiant
ATTORNEYS March 25, 1958    B. L. STEIERMAN    2,828,422
METHOD AND APPARATUS FOR GAUGING LIQUID LEVEL
Filed Aug. 9, 1954    3 Sheets-Sheet 2

INVENTOR
BERNARD L. STEIERMAN
BY W. A. Schaich
+ B C Toussiane
ATTORNEYS

March 25, 1958    B. L. STEIERMAN    2,828,422
METHOD AND APPARATUS FOR GAUGING LIQUID LEVEL
Filed Aug. 9, 1954    3 Sheets-Sheet 3

INVENTOR
BERNARD L. STEIERMAN
BY W A Schaich
+ B C Toussiant
ATTORNEYS

United States Patent Office 2,828,422
Patented Mar. 25, 1958

2,828,422
METHOD AND APPARATUS FOR GAUGING LIQUID LEVEL

Bernard L. Steierman, Toledo, Ohio, assignor to Owens-Illinois Glass Company, a corporation of Ohio Application August 9, 1954, Serial No. 448,728

16 Claims. (Cl. 250—43.5)

This invention relates to a method and apparatus for indicating and recording the level of a body of liquid, and particularly a method and apparatus for indicating and recording the level of molten glass in a glass furnace tank.

In the usual apparatus for gauging the level of liquids and particularly molten glass, openings must usually be made in the wall or roof of the container in order to accommodate the mechanical or other devices which are used to measure the liquid level. In addition to the additional expense involved in forming or cutting such openings, the resultant wall or roof is structurally weakened. In the case of molten glass the openings serve as a source of loss of heat, and in addition may be easily eroded causing the breakdown of the furnace tank.

It is therefore an object of this invention to provide a method and apparatus wherein the level of the body of liquid in a container, particularly molten glass in a glass furnace tank, may be gauged without forming an opening in the wall or roof of the container.

It is a further object of this invention to provide such a method and apparatus wherein the level may be accurately indicated at all times.

Other objects of the invention will appear hereinafter.

Basically, the method comprises directing the radiation from a source of radioactive radiation, positioned at one side of the body of liquid, in a plane which intersects the surface of the liquid to form an acute angle with the surface. A portion of the rays are directed above the surface and a portion thereof are directed below the surface. A measuring device such as an ion chamber is positioned at a point diametrically opposed to the source of radiation on the opposite side of the body of liquid. The measuring device is provided with a linear opening which forms an acute angle with the plane of radiation and the surface of the liquid. Relative transverse movement is then produced between the source of radiation and the measuring device in a direction substantially parallel with the surface, thereby causing the measuring device to measure the radiation at successive points across the path of travel.

At the point along the surface where the level of the liquid, plane of radiation and linear opening of the measuring device coincide, a sudden change in the amount of radiation measured by the measuring device is noted. This indicates the level of the liquid. As the level of the liquid changes, the point along the surface where the level, plane of radiation, and linear opening coincide will accordingly change. By initially calibrating the mechanism, the level of the liquid may be read directly. Alternatively, the measuring device may be coupled with electroresponsive means, hereinafter described, to record the level or to control the feeding of batch materials to the liquid container.

Referring to the accompanying drawings:

Fig. 1 is a part sectional isometric view of an apparatus embodying the invention;

Fig. 2 is a fragmentary sectional plan view of the apparatus;

Figure 3:
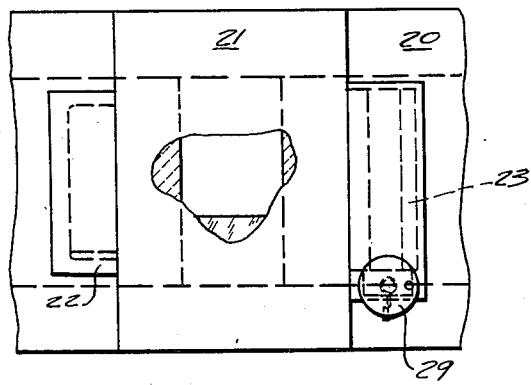
Fig. 3 is a part sectional elevational view of the apparatus.
Figure 4:
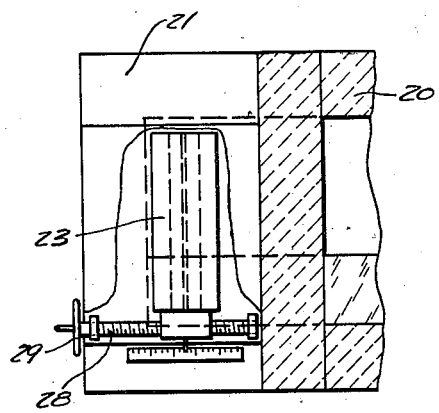
Fig. 4 is a part sectional end view of the apparatus.

Referring to Fig. 1, the apparatus may be used directly across the body of liquid in a glass furnace 20. Preferably an alcove 21 is provided at one side of the glass furnace into which a quiescent level of molten glass is provided. A linear source 22 of radioactive material is positioned at one side of the alcove and a measuring device 23 is positioned at a point diametrically opposed to said source of radiation.

The source 22 of radiation is preferably in the form of a wire of radioactive material mounted in a block 24 of radioactive insulation such as lead. The block 24 is provided with a slit 25 into which the wire is positioned, the slit being open to the side of the alcove 21.

In this manner the radiation is directed in a plane across the body of liquid. The plane of radiation forms an acute angle with the surface of the molten glass, a portion of the radiation passing above the surface of liquid, and another portion of radiation passing through the body of the liquid.

The measuring device 23 may comprise an ion chamber having a mask 26 provided with a collimating linear slit or opening 27 facing the source of radiation. The linear slit or opening 27 forms an acute angle with the plane of radiation and the surface of the molten glass as more fully described below.

Means is provided for producing a relative transverse movement between the source of radiation and the measuring device. This means may comprise a screw 28 onto which the measuring device is threadedly mounted and a handle 29 on the end of the screw. Rotation of the handle 29 causes the measuring device to move transversely in a direction substantially parallel to the surface of the glass. Suitable shielding 30 may be provided surrounding the measuring device in order that the radiation passing through the opposite wall of the alcove will not affect the persons working in the vicinity of the furnace.

Figure 5:
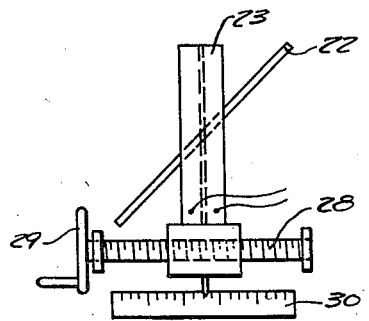
Fig. 5 is a diagrammatic representation of the relative positions of the source of radiation and the measuring device.

The preferred positions of the source of radiation and the measuring device are shown diagrammatically in Fig. 5. The plane of radiation 22 preferably forms an angle of 45° with the surface of the molten glass while the linear opening of the measuring device preferably forms an angle of 90° with the surface of the molten glass. As shown in Fig. 5, the movement of the measuring device 23 transversely causes the measuring device to measure the radiation entering through the linear opening at successive points along the projection of the plane of radiation.

Figure 6:
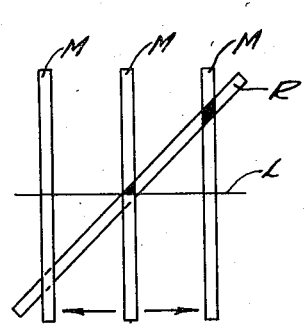
Fig. 6 is a diagrammatic representation of the relationship of the source of radiation, the measuring device and the liquid level.

This may be shown more clearly by reference to Fig. 6 which shows the position of the linear opening of the measuring device, represented by the letter M relative to the plane of radiation represented by the letter R and the glass level represented by the letter L. In the extreme position on the left of Fig. 6 the measuring device M "sees" the radiation which may pass through the body of molten glass. As the measuring device moves toward the right, the linear opening, plane of radiation and glass level will coincide and intersect, and the measuring device will suddenly "see" (darkened area) a greater amount of radiation. This sudden change will be an indication that the measuring device is at the point of intersection with the plane of radiation R and liquid level L. As the measuring device continues its movement toward the right in Fig. 6, the amount of radiation will increase and the measuring device will "see" that radiation shown by the darkened area.

Figure 7:
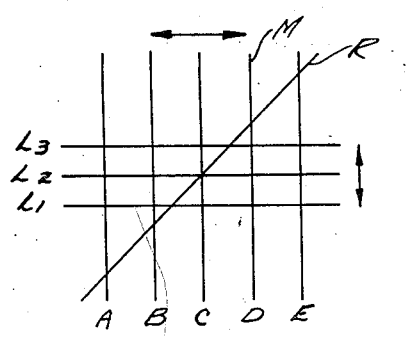
Fig. 7 is a diagram of the relative positions of the source of radiation and measuring device for different liquid levels.

As the level of the liquid changes, the position transversely at which the measuring device will indicate a sudden change in the amount of radiation will change. For example, as shown in Fig. 7, the plane of radiation R, measuring device M and liquid level intersect at different points transversely for different liquid levels. For liquid level $L_1$, the intersection will occur between positions B and C of the measuring device. For liquid level $L_2$ the intersection will occur at position C for the measuring device. For liquid level $L_3$ the intersection will occur between positions C and D of the measuring device.

Figure 8:
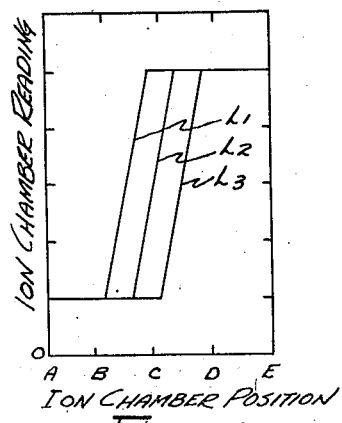
Fig. 8 is a graph of ion chamber readings versus ion chamber position for different liquid levels.

The manner in which the measuring device readings will change for different positions of the measuring device and different levels is represented in Fig. 8. For liquid level $L_1$, as the measuring device moves from positions A to E, there is a sudden change in the ion chamber reading between point B and C. For liquid level $L_2$ the change occurs at point C. For liquid level $L_3$ the change occurs between points C and D.

By initially calibrating the apparatus it is possible to determine the relationship between the transverse position of the measuring device and the actual level of the molten glass. This can be applied to a scale 30 positioned below the measuring device and a pointer can be mounted on the measuring device to indicate the level of the molten glass on the scale directly, as shown in Fig. 5.

Figure 9:
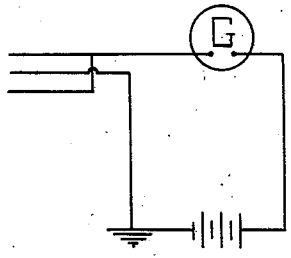
Fig. 9 is a diagrammatic wiring diagram which may be used in connection with the apparatus.

Alternatively, the output of the measuring device may be applied to a circuit measuring instrument such as a galvanometer G, shown in Fig. 9, from which the reading of the amount of radiation absorbed by the ion chamber can be recorded. This in turn can be read on a curve, such as shown in Fig. 8, to determine the level of the liquid.

Figure 11:
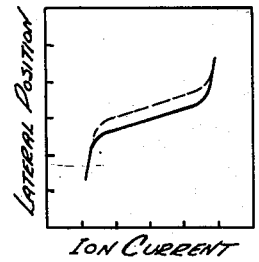
Fig. 11 is a curve of lateral position versus ion current such as might be obtained by using the apparatus shown in Fig. 10.
Figure 10:
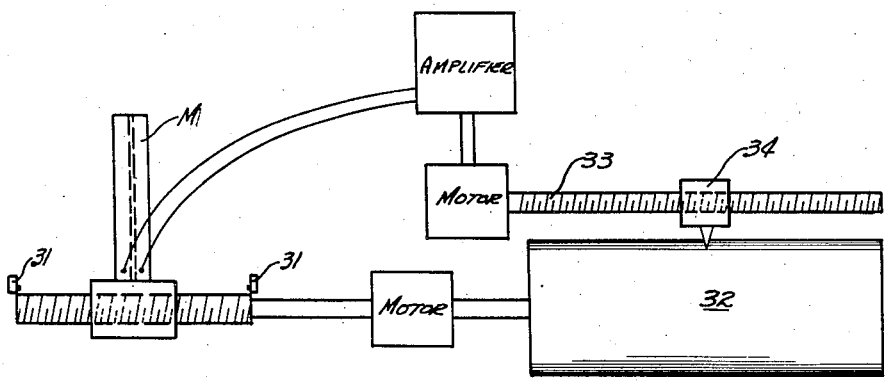
Fig. 10 is a diagrammatic representation of a recording device which may be used in conjunction with the apparatus.

Alternatively, the measuring device may be connected as shown in the diagrammatic representation in Fig. 10. The screw 28 may be rotated by a reversible motor which is caused to alternately move the measuring device transversely under the control of limit switches 31. The reversible motor may also be used to rotate a drum 32 whereby rotation of the drum will be directly related to the transverse position of the measuring device. The output of the measuring device may be electrically connected to an amplifier which in turn operates a second reversible motor rotating a screw 33 and moving an indicator and recording stylus 34 laterally along the drum 32. By such a mechanism a curve may be automatically drawn of lateral position versus ion current, such as shown in Fig. 11.

Figure 12:
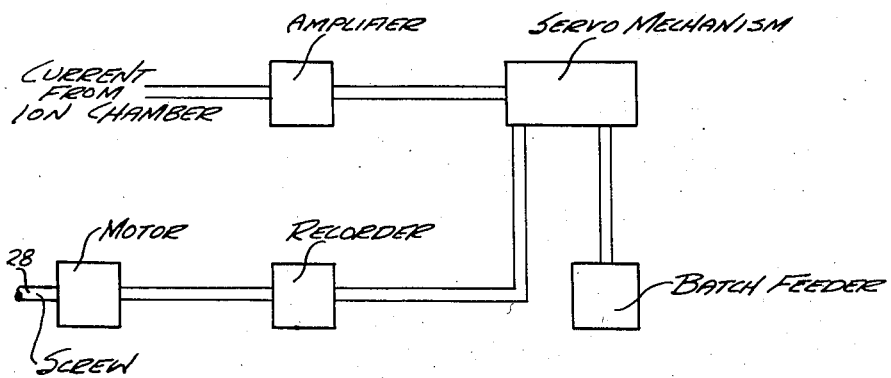
Fig. 12 is a diagrammatic representation of a control mechanism which may be used in conjunction with the apparatus.

Alternatively, the measuring device may be connected as shown in the diagrammatic representation in Fig. 12. In this arrangement the output from the measuring device is connected to an amplifier which in turn operates a servo-mechanism. The servo-mechanism actuates both a recording device and a batch feeder which controls the feeding of batch materials to the glass furnace. By such an arrangement, additional batch materials may be added sufficient to bring the liquid level to a preset height. It may thus be seen that an accurate determination of liquid level may be adjusted by directing a plane of radiation across the body of liquid and positioning a measuring device at a point diametrically opposite from the source of radiation, and subsequently causing a relative transverse movement between the source of radiation and the measuring device. The point at which the radiation measured by the measuring device changes is determinative of the liquid level. This may be used to show height on a linear scale, to record the level and/or to operate a batch feeder.

Modifications may be resorted to within the spirit and scope of my invention.

I claim:

1. The method of gauging the level of a body of liquid which comprises directing the radiation from a source of radioactive radiation on one side of said body of liquid in a plane which intersects the surface of liquid to form an acute angle with the surface, a portion of said rays of radiation being directed above the surface and a portion thereof being directed below the surface, positioning a measuring device at a point diametrically opposed to and at substantially the same level as said source of radiation on the opposite side of said body of liquid, producing relative transverse movement between the source of radiation and the measuring device in a direction substantially parallel with the surface of the liquid thereby causing said measuring device to measure the radiation in successive points across the path of travel.

2. The method of gauging the level of a body of liquid which comprises directing the radiation from a source of radioactive radiation on one side of said body of liquid in a plane which intersects the surface of the body of liquid to form an acute angle with the surface of the liquid, a portion of said rays of radiation being directed above the surface and a portion thereof being directed below the surface, positioning a measuring device at a point diametrically opposed to and at substantially the same level as said source of radiation and on the other side of said body of liquid, said measuring device comprising an ion chamber formed with a linear opening adjacent the body of liquid whereby radiation may enter said ion chamber only through said linear opening, said linear opening forming an angle with the plane of radiation and extending above and below the surface of the liquid, producing relative transverse movement between the source of radiation and the measuring device in a direction parallel with the surface of the liquid thereby causing the linear opening of said ion chamber to be intersected by the plane of radiation and causing said ion chamber to measure the radiation in successive planes across the path of travel.

3. The method of gauging the level of a body of liquid which comprises directing the radiation from a source of radioactive radiation at one side of said body of liquid in a plane which intersects the surface of the body of liquid to form an angle with the surface of the liquid, a portion of said rays of radiation being directed above the surface and a portion thereof being directed below the surface, positioning a measuring device at a point diametrically opposed to and at substantially the same level as said source of radiation and on the other side of said body of liquid, said measuring device comprising an ion chamber formed with a linear opening adjacent the body of liquid whereby radiation may enter said ion chamber only through said linear opening, said linear opening forming an angle of approximately 45° with the plane of radiation and extending above and below the surface of the liquid, producing relative transverse movement between the source of radiation and the measuring device in a direction parallel with the surface of the liquid thereby causing the linear opening of said ion chamber to be intersected by the plane of radiation and causing said ion chamber to measure the radiation in successive planes across the path of travel.

4. The method of gauging the level of a body of liquid which comprises directing the radiation from a source of radioactive radiation at one side of said body of liquid in a plane which intersects the surface of the body of liquid to form an acute angle of approximately 45° with the surface of the liquid, a portion of said rays of radiation being directed above the surface and a portion thereof being directed below the surface, positioning a measuring device at a point diametrically opposed to and at substantially the same level as said source of radiation and on the other side of said body of liquid, said measuring device comprising an ion chamber formed with a linear opening adjacent the body of liquid whereby radiation may enter said ion chamber only through said linear opening, said linear opening forming an angle of approximately 45° with the plane of radiation and approximately 90° with the surface of the liquid and extending above and below the surface of the liquid, producing relative transverse movement between the source of radiation and the measuring device in a direction parallel with the surface of the liquid thereby causing the linear opening of said ion chamber to be intersected by the plane of radiation and causing said ion chamber to measure the radiation in successive planes across the path of travel.

5. The method of gauging the level of a body of liquid which comprises positioning a linear source of radioactive radiation at one side of said body of liquid whereby said source forms an angle with the surface of the liquid, a portion of the rays of radiation from said source passing above the surface and a portion thereof passing into said body of liquid, positioning a measuring device at a point diametrically opposite to and at substantially the same level as said source of radiation and on the other side of said body of liquid, causing a relative transverse movement between the source of radiation and the measuring device in a direction parallel with the surface of the liquid thereby measuring the radiation in successive planes across the path of travel.

6. The method of gauging the level of a body of liquid which comprises positioning a linear source of radioactive radiation at one side of said body of liquid whereby said source forms an angle with the surface of the liquid, a portion of the rays of radiation from said source passing above the surface and a portion thereof passing into said body of liquid, positioning a measuring device at a point diametrically opposite to and at substantially the same level as said source of radiation and on the other side of said body of liquid, said measuring device having a limited lateral field and a relatively long longitudinal field extending above and below the surface of the glass and forming an acute angle with the linear source of radiation, causing a relative transverse movement between the source of radiation and the measuring device in a direction parallel with the surface of the liquid thereby measuring the radiation in successive planes across the path of travel.

7. The method of gauging the level of a body of liquid which comprises positioning a linear source of radioactive radiation at one side of said body of liquid whereby said source forms an angle with the surface of the liquid, a portion of the rays of radiation from said source passing above the surface and a portion thereof passing into said body of liquid, positioning a measuring device at a point diametrically opposite to and at substantially the same level as said source of radiation and on the other side of said body of liquid, said measuring device having a limited lateral field and a relatively long longitudinal field extending above and below the surface of the glass and forming an angle of approximately 45° with the linear source of radiation, causing a relative transverse movement between the source of radiation and the measuring device in a direction parallel with the surface of the liquid thereby measuring the radiation in successive planes across the path of travel.

8. The method of gauging the level of a body of liquid which comprises positioning a linear source of radioactive radiation at one side of said body of liquid whereby said source forms an angle of 45° with the surface of the liquid, a portion of the rays of radiation from said source passing above the surface and a portion thereof passing into said body of liquid, positioning a measuring device at a point diametrically opposite to and at substantially the same level as said source of radiation and on the other side of said body of liquid, said measuring device having a limited lateral field and a relatively long longitudinal field extending above and below the surface of the glass and forming an angle of approximately 90° with the surface of the glass, causing a relative transverse movement between the source of radiation and the measuring device in a direction parallel with the surface of the liquid thereby measuring the radiation in successive planes across the path of travel.

9. An apparatus for gauging the level of a body of liquid which comprises means for directing radiation in a plane onto one side of the body of liquid to be gauged and at an acute angle with the surface, measuring means positioned at a point diametrically opposed from and at substantially the same level as said means for directing radiation, and means for producing relative transverse movement between the means for directing radiation and the measuring means in a direction substantially parallel with the surface of the liquid thereby causing said measuring means to measure the radiation at successive points across the path of travel.

10. An apparatus for gauging the level of a body of liquid which comprises means for directing radiation from a source of radioactive radiation on one side of a body of liquid in a plane which intersects the surface of the body of liquid from an acute angle with the surface, a measuring device positioned at a point diametrically opposed to and at substantially the same level as the source of radiation on the other side of said body of liquid, said device comprising an ion chamber formed with a linear opening adjacent the body of liquid whereby radiation may enter said ion chamber only through said linear opening, said linear opening extending above and below the surface of the liquid, and means for causing relative transverse movement between the means for directing the radiation and the measuring device in a direction parallel with the surface of the liquid, thereby causing the linear opening of said ion chamber to be intersected by the plane of radiation and causing said ion chamber to measure the radiation in successive planes across the path of travel.

11. An apparatus for gauging the level of a body of liquid which comprises means for directing radiation in a plane onto one side of the body of liquid to be gauged and at an acute angle with the surface, measuring means positioned at a point diametrically opposed from and at substantially the same level as said means for directing radiation, and means for producing relative transverse movement between the means for moving said measuring means in a direction substantially parallel with the surface of the liquid thereby causing said measuring means to measure the radiation at successive points across the path of travel.

12. An apparatus for gauging the level of a body of liquid which comprises means for directing radiation from a source of radioactive radiation on one side of a body of liquid in a plane which intersects the surface of the body of liquid to form an acute angle with the surface, a measuring device positioned at a point diametrically opposed to and at substantially the same level as the source of radiation on the other side of said body of liquid, said device comprising an ion chamber formed with a linear opening adjacent the body of liquid whereby radiation may enter said ion chamber only through said linear opening, said linear opening extending above and below the surface of the liquid, said linear opening being non-parallel to the plane of radiation, and means for causing relative transverse movement between the means for directing the radiation and the measuring device in a direction parallel with the surface of the liquid, thereby causing the linear opening of said ion chamber to be intersected by the plane of radiation and causing said ion chamber to measure the radiation in successive planes across the path of travel.

13. An apparatus for gauging the level of a body of liquid which comprises means for directing radiation in a plane onto one side of the body of liquid to be gauged and at an acute angle with the surface, measuring means positioned at a point diametrically opposed from and at substantially the same level as said means for directing radiation, and means for producing relative transverse movement between the means for directing radiation and the measuring means in a direction substantially parallel with the surface of the liquid thereby causing said measuring means to measure the radiation at successive points across the path of travel, a circuit in which said measuring means is electrically connected, electroresponsive means in said circuit, and recording means actuated by said electroresponsive means to record the reading of said measuring means at various transverse positions of said measuring means.

14. An apparatus for gauging the level of a body of liquid which comprises means for directing radiation from a source of radioactive radiation on one side of a body of liquid in a plane which intersects the surface of the body of liquid to form an acute angle with the surface, a measuring device positioned at a point diametrically opposed to and at substantially the same level as the source of radiation on the other side of said body of liquid, said device comprising an ion chamber formed with a linear opening adjacent the body of liquid whereby radiation may enter said ion chamber only through said linear opening, said linear opening extending above and below the surface of the liquid, means for causing relative transverse movement between the means for directing the radiation and the measuring device in a direction parallel with the surface of the liquid, thereby causing the linear opening of said ion chamber to be intersected by the plane of radiation and causing said ion chamber to measure the radiation in successive planes across the path of travel, circuit in which said ion chamber is electrically connected, and electroresponsive means in said circuit.

15. The apparatus set forth in claim 12 wherein the linear opening forms an angle of 45° with the plane of radiation.

16. The apparatus set forth in claim 15 wherein the linear opening forms an angle of 90° with the surface of the liquid.

References Cited in the file of this patent

UNITED STATES PATENTS

| | | |
|---|---|---|
| 2,378,219 | Hare | June 12, 1945 |
| 2,613,326 | Herzog | Oct. 7, 1952 |
| 2,674,695 | Grace | Apr. 6, 1954 |